(12) United States Patent
Rasin et al.

(10) Patent No.: US 7,783,699 B2
(45) Date of Patent: Aug. 24, 2010

(54) USER INTERFACE SYSTEM FOR A VEHICLE

(75) Inventors: Vladimir Rasin, Northville, MI (US);
Mark Schunder, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 910 days.

(21) Appl. No.: 11/424,994

(22) Filed: Jun. 19, 2006

(65) Prior Publication Data

US 2007/0294625 A1 Dec. 20, 2007

(51) Int. Cl.
G06F 15/16 (2006.01)
G06F 3/048 (2006.01)
(52) U.S. Cl. .......................... 709/203; 709/217; 701/36
(58) Field of Classification Search ......... 709/202–203, 709/217–219; 700/83; 701/36; 715/513, 715/700, 760, 764
See application file for complete search history.

(56) References Cited

U.S. PATENT DOCUMENTS

2004/0034455 A1* 2/2004 Simonds et al. ................ 701/1
2004/0056890 A1* 3/2004 Hao et al. .................... 345/744

* cited by examiner

Primary Examiner—Peling A Shaw
(74) Attorney, Agent, or Firm—Jennifer M. Stec; Brooks Kushman P.C.

(57) ABSTRACT

A user interface system and method for a vehicle enables access to services available through an electronic device. The user interface system includes a networking gateway configured to receive a first data set from the electronic device. A service engine is included, which is operable with the networking gateway. The service engine is configured to process the first data set and output a second data set that corresponds to the services. A data transformation agent receives the second data set and generates a third data set, wherein the third data set is in a predetermined format. A user interface module is included that is configured to communicate with the data transformation agent. The user interface module receives the third data set having the predetermined format and the user interface module provides an interface for the user to access the services available through the electronic device.

20 Claims, 3 Drawing Sheets

USER INTERFACE SYSTEM FOR A VEHICLE

TECHNICAL FIELD

The present invention relates generally to a user interface system for a vehicle that enables access to an electronic device.

BACKGROUND OF THE INVENTION

The use of electronic devices in vehicles is common. Particularly, it is well known that consumers utilize devices such as phones, PDAs, and computers to access information. To facilitate the use of these devices, the vehicle typically includes a user interface that enables the user to access the electronic device and utilize services and/or applications located thereon. Conventionally, the vehicle user interface is specifically programmed to operate with an electronic device so as to utilize the specific applications and/or services available through the electronic device. Such programming typically requires manual programming by an authorized dealership or designer. Accordingly, the conventional user interface systems are incapable of dynamic programming or synchronization to enable access to services available through electronic devices.

The present invention was conceived in view of these and other disadvantages of conventional user interface systems.

SUMMARY OF THE INVENTION

The present invention discloses a user interface system and method for a vehicle that enables access to services available through an electronic device. In one embodiment, user interface system includes a networking gateway configured to receive a first data set from the electronic device for service discovery. A service engine is included, which is operable with the networking gateway. The service engine is configured to process the first data set and output a second data set that corresponds to the services. A data transformation agent receives the second data set and generates a third data set, wherein the third data set is in a predetermined format. A user interface module is included that is configured to communicate with the data transformation agent. The user interface module receives the third data set having the predetermined format and, based in part on the third data set, the user interface module provides an interface for the user to access the services available through the electronic device.

The method for accessing services available through the electronic device include receiving a first data set from the electronic device. The method also includes generating a second data set based on the first data set through the use of a networking gateway. The method further includes receiving the second data set at a data transformation agent. Another step includes generating a third data set through the use of a data transformation agent and receiving the third data set at a user interface module. The third data set is processed by the user interface module so as to provide the user access to the services available through the electronic device.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings in which:

DETAILED DESCRIPTION OF THE EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular proponents. Therefore, specific functional details disclosed herein are not to be interpreted as limiting, but merely as a representative basis for the claims and/or as a representative basis for teaching one skilled in the art to variously employ in the present invention.

Figure 1:
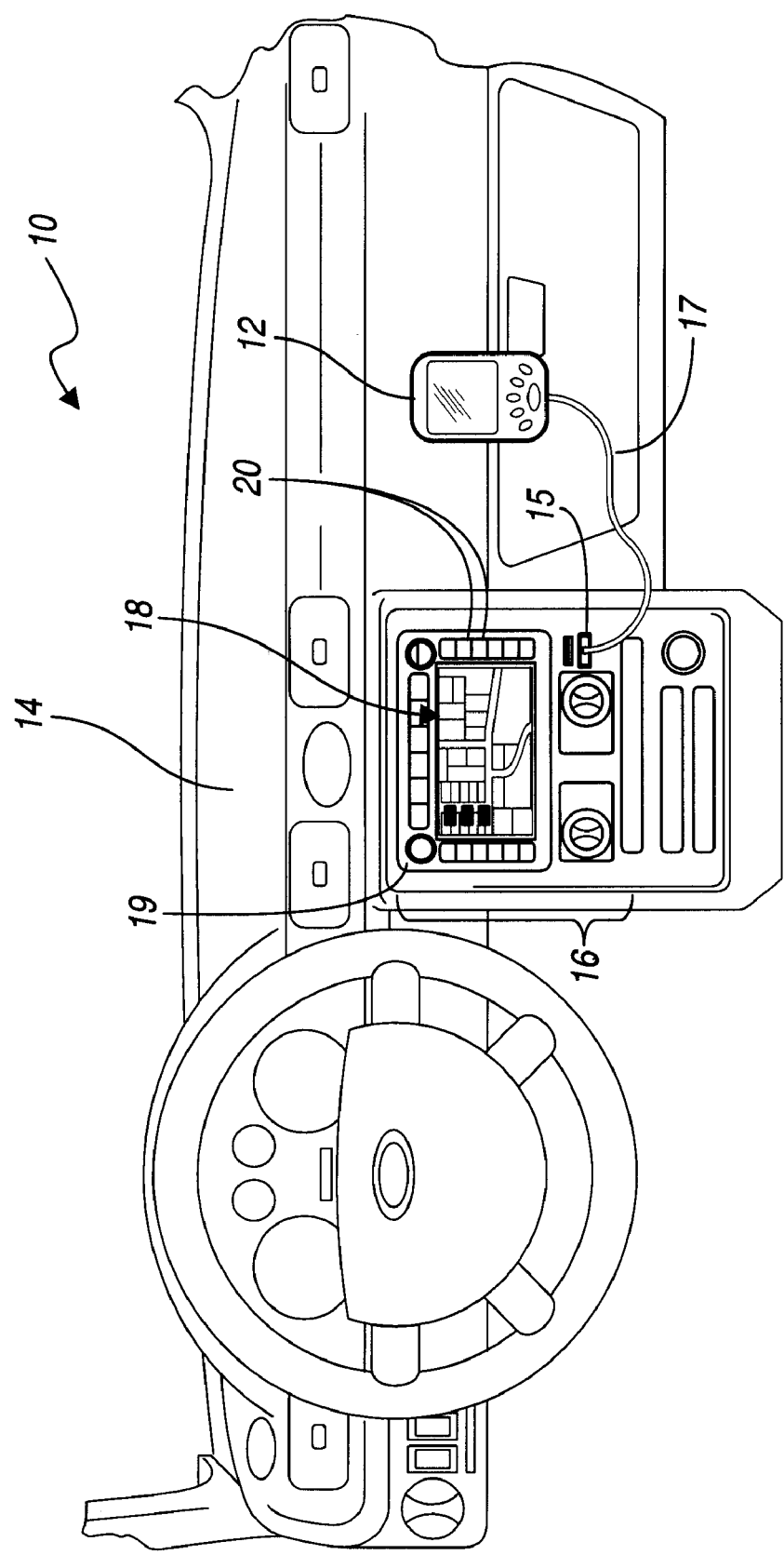
FIG. 1 illustrates a vehicle having a user interface system that enables access to services available through an electronic device in accordance with an embodiment of the present invention.

Referring to FIG. 1, a vehicle 10 is illustrated that is configured to communicate and enable access to electronic devices including services and/or applications (collectively referred to as services) available via the electronic devices. These services include, but are not limited to, cellular phone service, satellite radio service, email services, computer application service and the like. In one aspect of the present invention, the electronic devices may be virtually any external device including, but not limited to, a personal digital assistant (PDA), a handheld computer, and the like.

As shown, vehicle 10 includes an instrument panel 14 having a user interface system 16. The user interface system 16, which may be referred to as an in-vehicle human machine interface (HMI), provides vehicle occupants information/data pertaining to vehicle 10, its systems, and devices, including services available through an electronic device 12. As such, user interface system 16 has a display unit 18, a user interface module 19 and multiple selection devices 20.

Display unit 18 is adapted to display information such as maps generated by a navigation system, audio system information, climate information, and services/applications that are accessible through the use of electronic device 12. Furthermore, display unit 18 may be configured to receive inputs from a user. Selection devices 20 may be buttons or keys that are designated to effect certain functions by user interface system 16 and electronic device 12. It is recognized that in alternative embodiments selection devices 20 may be embodied as "soft keys" that appear on the display of display unit 18. User interface system 16 also includes a user interface module 19 having a controller that is capable of processing and storing data in memory. The controller of user interface module 19 may have stored therein at least one data set, which may describe default functions and capabilities of user interface system 16 including display unit 18, user interface module 19, and selection devices 20.

As described in the foregoing, electronic device 12 may be a PDA, a handheld computer, a cellular telephone, a smart phone, a laptop and the like that is capable of providing services and applications for use by vehicle occupants. Electronic device 12 may also have one or more data sets stored in memory that describe or correspond to the services and/or applications available via device 12. Alternatively, electronic device 12 may serve as a conduit through which the vehicle can access desired services remotely.

In either embodiment, electronic device 12 may be connected to user interface system 16 through the use of a port 15, which includes universal serial bus (USB) ports and the like. However, although electronic device 12 is physically connected to user interface 16 through the use of a cable 17, it is recognized that communications may occur wirelessly. For instance, it is contemplated by the present invention that electronic device 12 may communicate with user interface system 16 via a wireless protocol including, but not limited to bluetooth, wi-fi, and the like. As described above, unlike conventional systems, user interface system 16 is capable of automatic programming, reprogramming and/or synchronization with devices, such as electronic device 12, to enable access to services available through the devices.

Figure 2:
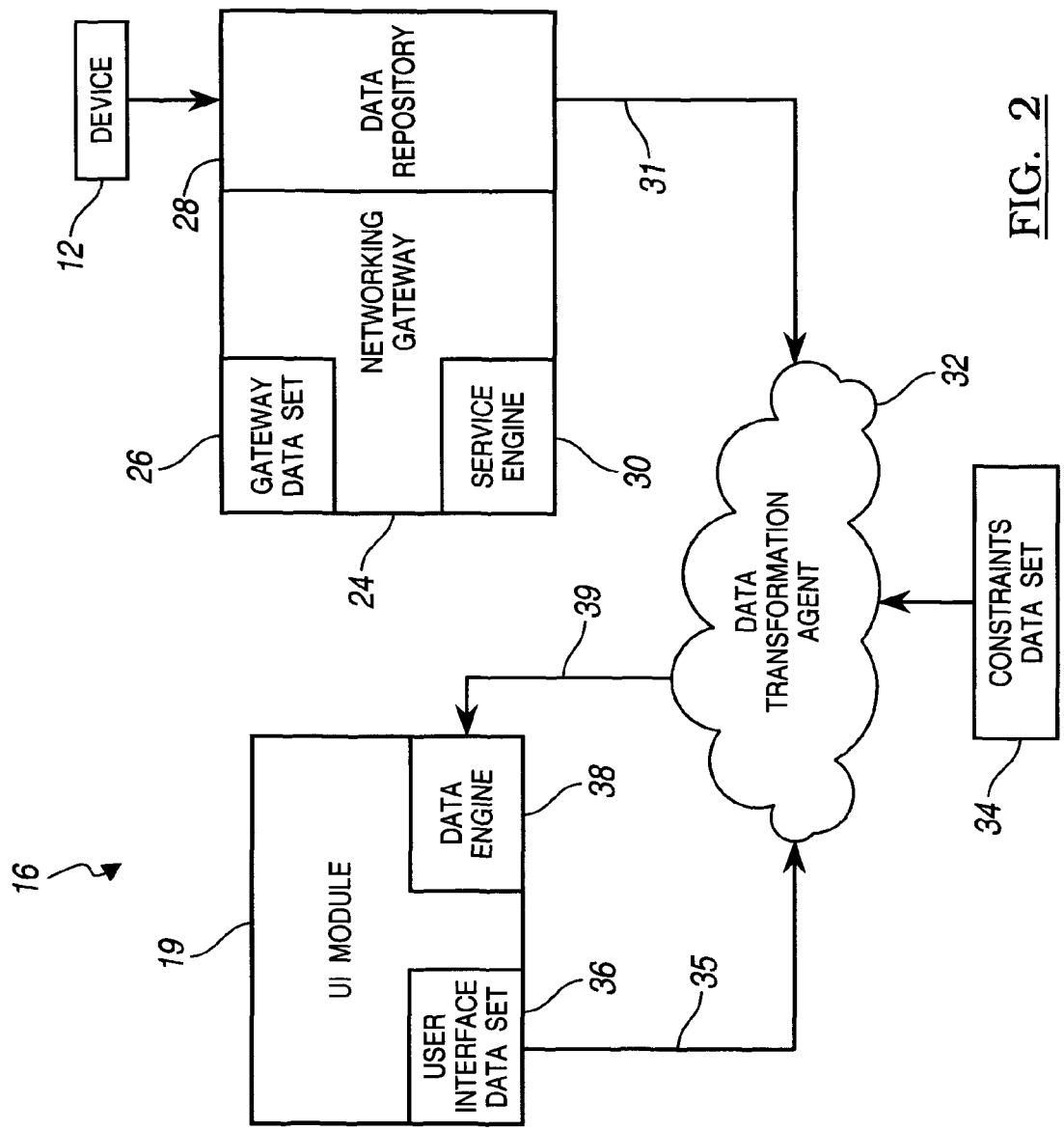
FIG. 2 illustrates a block diagram of a user interface system in accordance with an embodiment of the present invention.

Referring to FIG. 2, a block diagram of user interface system 16 in communication with electronic device 12 is illustrated. As shown, device 12 communicates with user interface system 16 in a manner so as to enable a user to access available services. User interface system 16 is capable of accessing the services available through device 12 by receiving and processing data sets from device 12. In the illustrated embodiment, user interface system 16 includes user interface module 19, a networking gateway 24, and a data transformation agent 32. It is recognized, however, that alternative embodiments, may have multiple user interface modules 19. For example, a vehicle may include a first user interface module located the vehicle instrument panel and a second user interface module located in a rear seat entertainment unit.

In either embodiment, upon connection of device 12 to the vehicle (either by-wire or wirelessly), device 12 transmits a data set to user interface system 16. Reception of the data set may be referred to as service discovery, wherein services available through device 12 are acknowledged by user interface system 16.

The networking gateway 24 initially receives the data set. Networking gateway 24 includes a data repository 28, a gateway data set 26, and a service engine 30. Service engine 30 is configured to establish communications with devices such as device 12 and to generate a corresponding data set in a desired format that describes the available services. In one embodiment, service engine 30 may be referred to as a vehicle services description language (VSDL) engine, which may be an extensible markup language (XML) based description of the services. The VSDL embodiment does not require heterogenous elements that are found in heterogenous systems (e.g., web service definition language (WSDL), simple object access protocol (SOAP), etc.).

Data repository 28 provides a plurality of default software constructs that describes communication parameters, features of device 12, and services that may be available via device 12. In one aspect of the invention, data repository 28 has data stored in a format that is based on the VSDL. As such, the default software constructs of data repository 28 may be embodied as XML data. Additionally, gateway data set 26 includes data that describes capabilities, functions, and features of the networking gateway. Based on the data available from gateway data set 26 and data repository 28, service engine 30 generates a data set signal 31 that is received by a data transformation agent 32. In one embodiment, data set signal 31 may be a VSDL dataset that is XML based.

Data transformation agent 32 may be embodied as a software program or data set containing a set of predetermined rules by which received data sets are processed. Accordingly, a constraints data set 34 may contain a plurality of constraints by which these rules are based. In one embodiment, the rules by which data sets are processed are implemented in an XML based vehicle constraints markup language (VCML). These constraints may be used to control the appearance of information displayed by the user interface system display unit (FIG. 1) and ensure that proper functionality and service behavior by user interface system 16 occurs.

As such, the constraints data set 34 may contain certain data that ensures various performance parameters including, but not limited to, safety, security, regulatory, and vehicle design. The data of constraints data set 34 may include static and dynamic data, which may be loaded into the vehicle at any time. For example, in one embodiment, the data transformation agent having data from constraints data set 34 may be loaded into the user interface system simultaneously with data to be stored within data repository 28.

As described in the foregoing, the user interface system includes user interface module 19. User interface module 19 may include a user interface data set 36 and a data engine 38. User interface data set 36 contains data which describes functions and features of the user interface module. For example, the user interface data set may include data that describes the number of buttons or keys 20 (FIG. 1) as well as the screen size of display 18. In one embodiment, the data contained by the user interface data set may be hard coded in a vehicle user interface markup language (VUML). In such an embodiment, the VUML is an XML based language.

Once user interface data set 36 is loaded into user interface module 19, data transformation agent 32 receives a data set signal 35 which corresponds to the data within user interface data set 36. As described above, data transformation agent 32 is configured to process data sets received. Accordingly, when data transformation agent 32 receives data sets 31 and 35, a data set 39 is generated. Data set 39 includes data that has been certified by data transformation agent 32 for use by user interface module 19. In one aspect of the invention, data set 39 may be a VUML data set that is XML based.

Data engine 38 is responsible for generic interaction with the user and may contain a specification in electronic form that also controls the appearance and/or function of the user interface module display. The specification, which may include XML based data, may be used by data engine 38 to ensure that buttons or keys on the user interface module effect desired user interface system functions operations. As such, the data signal 39 may be received by data engine 38 so as to enable the user interface system to provide a seamless interface for the user to access services available through electronic device 12.

Figure 3:
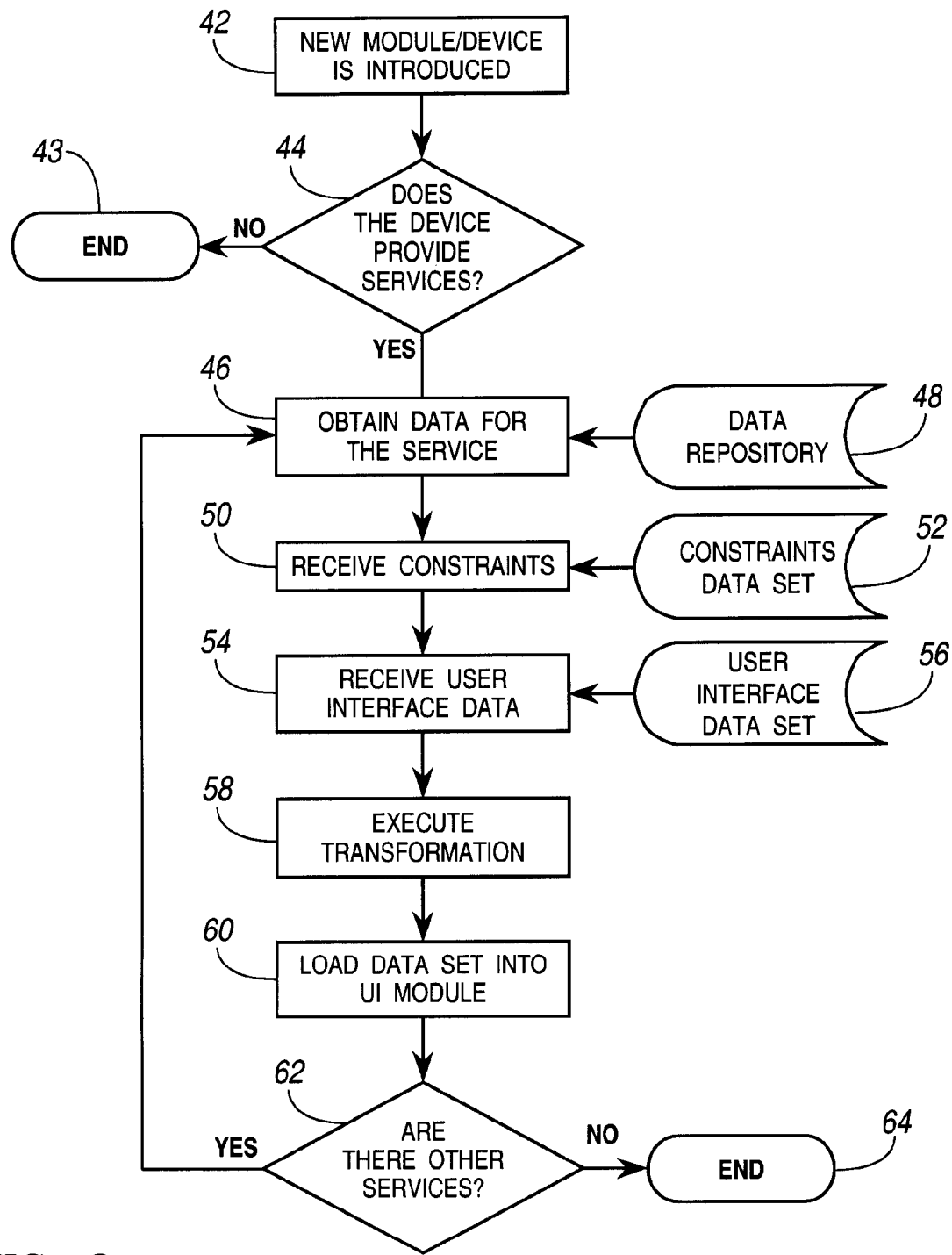
FIG. 3 illustrates a flow chart of a method for enabling access to electronic devices through the use of a user interface system in accordance with an embodiment of the present invention.

Now, referring to FIG. 3, a flow chart illustrates a method for accessing services available through the electronic device. Block 42 illustrates a step wherein the electronic device is introduced or acknowledged. Block 44 illustrates a step wherein the user interface system, through the use of the networking gateway determines whether the electronic device offers any services (also referred to as service discovery). If the electronic device does not offer any services, the method terminates as indicated at block 43. If the device does offer services, a block 46 occurs. At block 46, in response to data provided by the data repository (block 48), the user interface system obtains data that indicates the services available through the electronic device. As described above, the step of obtaining the data may occur through the use of the networking gateway (FIG. 2).

At block 50, the user interface system, via the data transformation agent receives constraints that provide a set of rules by which the data is processed. As shown by block 52, the constraints, embodied as data, may be stored in the constraints data set. As described in the foregoing, the constraints data set may include rules in an XML based format that control the manner in which the data transformation agent processes received data sets.

As depicted by block 54, the user interface data is received via the data transformation agent. Block 56 depicts the user interface data set which includes data that describes the appearance and functions of the user interface module. Block 58 depicts a step wherein the data transformation agent executes a transformation of the data sets that are received from the user interface data set, the constraints data set, and the data set signal generated by the networking gateway. This transformation, in one embodiment, results in the generation of a VUML type data set, that is compatible with the user interface module. Accordingly, block 60 depicts a step wherein the processed or transformed data sets are loaded into the user interface module. Block 62 includes the step of determining whether additional services are available via the electronic device. If additional services are available, the method returns to block 46 where the foregoing method if repeated. If there exists no additional services, the method terminates at block 64.

While the best mode for carrying out the invention has been described in detail, those familiar with the art to which this invention relates will recognize various alternative designs and embodiments for practicing the invention as defined by the following claims.

What is claimed:

1. A user interface system for a vehicle that enables a user to access services available through an electronic device, the system comprising:
    a networking gateway configured to receive a first data set from the electronic device, the first data set identifying the services available through the electronic device;
    a data repository that stores default software constructs relating to the services available through the electronic device;
    a service engine operable with the networking gateway and the data repository, the service engine processing the first data set and outputting a vehicle services description language (VSDL) data set that corresponds to the services based at least in part upon the first data set and the default software constructs;
    a data transformation agent for receiving the VSDL data set and at least one constraint, the data transformation agent generating a vehicle user interface markup language (VUML) data set based at least in part upon the VSDL data set and the at least one constraint; and
    a user interface module configured to communicate with the data transformation agent, the user interface module receiving the VUML data set and, based in part on the VUML data set, the user interface module providing an interface for the user to access the services available through the electronic device.

2. The user interface system of claim 1, wherein the user interface module includes:
    a display unit having a display for providing information related to the services; and
    a data engine configured to receive the VUML data set, the data engine containing a specification that controls appearance of the display upon receipt of the VUML data set.

3. The user interface system of claim 1, wherein the user interface module includes a user interface data set that describes functions of the user interface module, the user interface data set being received by the data transformation agent and the data transformation agent generating the VUML data set based in part upon the user interface data set.

4. The user interface system of claim 1, wherein the VSDL data set is compatible with the user interface module.

5. The user interface system of claim 1, wherein the data transformation agent contains a predetermined set of rules by which the VUML data set is generated.

6. The user interface system of claim 5, wherein the predetermined set of rules are comprised of an extensible markup language (XML) based vehicle constraints markup language (VCML).

7. The user interface system of claim 1, wherein the networking gateway includes a gateway data set that contains data associated with at least one of functions and features of the networking gateway.

8. The user interface system of claim 1, wherein the VSDL data set and the VUML data set have a format that is based on an extensible markup language (XML).

9. A method for accessing services available through an electronic device, the method comprising:
    receiving a first data set from the electronic device at a networking gateway for a vehicle user interface system;
    generating at the networking gateway a vehicle service description language (VSDL) data set based on the first data set through the use of a service engine;
    receiving the VSDL data set and at least one constraint at a data transformation agent of the vehicle user interface system;
    generating a vehicle user interface markup language (VUML) data set through the use of the data transformation agent, the VUML data set based at least in part upon the VSDL data set and the at least one constraint; and
    receiving the VUML data set at a user interface module for the user interface system, wherein the VUML data set is processed by the user interface module to provide access to the services available through the electronic device.

10. The method of claim 9, wherein the data transformation agent includes a predetermined set of rules by which the VUML data set is generated.

11. The method of claim 9, wherein the user interface module includes a user interface data set that describes functions of the user interface module, the user interface data set being received by the data transformation agent and the data transformation agent generating the VUML data set based in part upon the user interface data set.

12. The method of claim 9, wherein the networking gateway includes a gateway data set that contains data associated with at least one of functions and features of the networking gateway.

13. A user interface system for a vehicle that enables a user to access services available through an electronic device, the system comprising:
    a networking gateway configured to receive a first data set from the electronic device, the networking gateway including a service engine, a data repository and a gateway data set, the networking gateway generating a vehicle services description language (VSDL) data set corresponding to the services available based upon the first data set using the service engine, the data repository and the gateway data set;
    a user interface module having a display unit, a data engine and a user interface data set, the user interface module providing an interface for the user to access the services available through the electronic device;
    a data transformation agent being operable with the networking gateway and the user interface module and having in memory at least one constraint, the data transformation agent for transforming the user interface data set and the VSDL data set into a vehicle user interface markup language (VUML) data set based on the at least one constraint, the user interface data set, and the VSDL data set; and wherein the data engine processes the VUML data set so as to enable the user to access the services available through the electronic device.

14. The user interface system of claim 13, wherein the VSDL data set and the user interface data set have a format based on an extensible markup language (XML).

15. The user interface system of claim 13, wherein the user interface data set contains data associated with at least one of functions and features of the user interface module.

16. The user interface system of claim 13, wherein the gateway data set contains data associated with at least one of functions and features of the networking gateway.

17. The user interface system of claim 13, wherein the VSDL data set contains data associated with the services available through the electronic device.

18. The user interface system of claim 13, wherein the at least one constraint controls appearance of the display unit.

19. The user interface system of claim 1, wherein the at least one constraint controls appearance of a display unit.

20. The method of claim 9, wherein the at least one constraint controls appearance of a display unit.

* * * * *